United States Patent
Aristides

(10) Patent No.: US 10,552,888 B1
(45) Date of Patent: Feb. 4, 2020

(54) SYSTEM FOR DETERMINING RESOURCES FROM IMAGE DATA

(71) Applicant: AMAZON TECHNOLOGIES, INC., Seattle, WA (US)

(72) Inventor: Phivos Costas Aristides, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1086 days.

(21) Appl. No.: 14/502,705

(22) Filed: Sep. 30, 2014

(51) Int. Cl.
  *G06Q 30/06* (2012.01)
  *G06K 9/46* (2006.01)

(52) U.S. Cl.
  CPC .......... *G06Q 30/0631* (2013.01); *G06K 9/46* (2013.01)

(58) Field of Classification Search
  CPC .................................. G06Q 30/06; G06K 9/46
  See application file for complete search history.

(56) References Cited

U.S. PATENT DOCUMENTS

| | | | | |
|---|---|---|---|---|
| 7,024,051 | B2 * | 4/2006 | Miller | G06F 8/60 348/E5.042 |
| 8,194,993 | B1 * | 6/2012 | Chen | G06T 5/006 348/231.6 |
| 8,577,753 | B1 | 11/2013 | Vincent et al. | |
| 2004/0165769 | A1 * | 8/2004 | Huh | H04N 5/57 382/162 |
| 2004/0212700 | A1 * | 10/2004 | Prabhu | G06F 8/60 348/231.99 |
| 2008/0215571 | A1 * | 9/2008 | Huang | G06F 16/345 |
| 2008/0216002 | A1 * | 9/2008 | Morita | G06F 16/4393 715/764 |
| 2011/0191367 | A1 * | 8/2011 | Wook | G06F 17/30 707/769 |
| 2012/0229654 | A1 * | 9/2012 | Solomon | H04N 5/2251 348/207.1 |
| 2012/0268612 | A1 | 10/2012 | Wang et al. | |
| 2013/0282821 | A1 * | 10/2013 | Muriello | H04N 21/44008 709/204 |

OTHER PUBLICATIONS

Gargi, Ullas, Yining Deng, and Daniel R. Tretter. "Managing and searching personal photo collections." Storage and Retrieval for Media Databases 2003. vol. 5021, International Society for Optics and Photonics, 2003. (Year: 2003).*

Caicedo, Juan C., Ashish Kapoor, and Sing Bing Kang. "Collaborative personalization of image enhancement." CVPR 2011. IEEE, 2011 (Year: 2011).*

* cited by examiner

Primary Examiner — Marissa Thein
Assistant Examiner — Michelle T Kringen
(74) Attorney, Agent, or Firm — Lindauer Law, PLLC

(57) ABSTRACT

Described are techniques for determining one or more resources usable to produce an image from content data associated with existing images selected by a user. User preference data indicative of a set of images may be generated, and from the image data and resource data associated with the set of images, one or more resources used to produce the images may be determined. Output data indicative of the resources may be generated for provision to a user.

20 Claims, 8 Drawing Sheets

SYSTEM FOR DETERMINING RESOURCES FROM IMAGE DATA

BACKGROUND

A large number of cameras, related accessories, software, and other resources for generating and modifying images exist. Resources (e.g., cameras, lenses, flashes, strobe lights, accessories, equipment, output devices, output media, software, and so forth usable to produce images) may be suitable or unsuitable for producing specific types of images. Use of cameras and related resources often requires specialized knowledge that a user seeking to purchase such resources may lack. As such, a user may encounter difficulty when attempting to produce images of a similar type or quality as existing images they may prefer.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
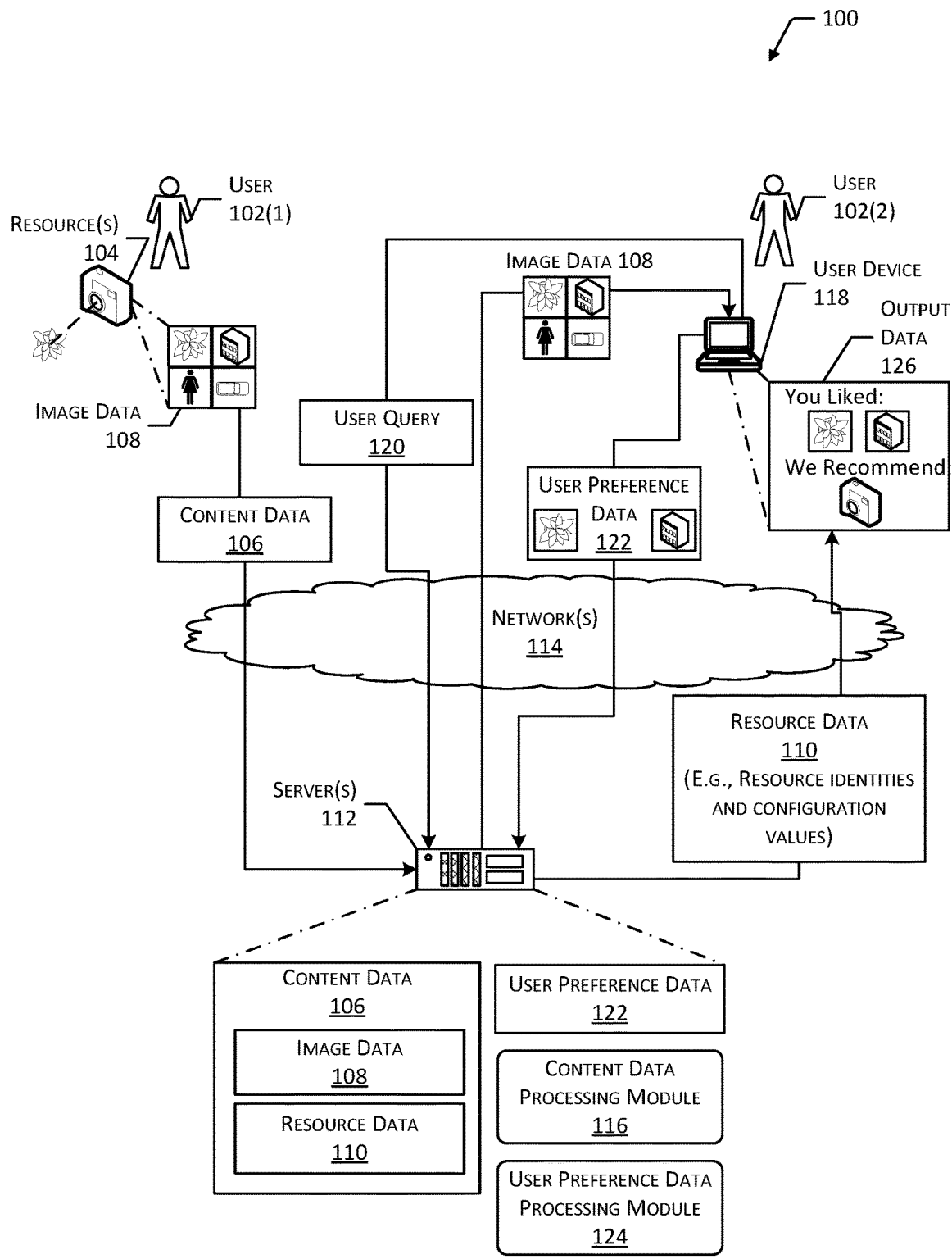
FIG. 1 depicts a system for determining resources used to produce one or more images.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The quality and characteristics of an image or video produced by a user may be affected by numerous factors. The resources used to produce that image (or video) may have an impact on the images that result. For example, resources used to produce an image or video may include cameras, lenses, filters, flashes, strobe lights, reflectors, or other equipment or accessories. Resources may also include software used to produce or modify images or videos. Resources may further include display devices, printers, or other output devices used to generate a visible image from data. Additionally, resources may include materials adapted for application of an image thereto. For example, such materials may include paper, film, or other media on which an image may be printed or otherwise applied, as well as non-standard media (e.g., consumer products, such as coffee mugs, smartphone covers, clothing, and so forth). The type, configuration settings, placement, and method of use for one or more of the resources, and any post-processing or other modifications may contribute to the quality and characteristics of the image or video. A large variety of resources that may be used to generate images exist, and the resources best suited for a user may vary significantly depending on the desired characteristics of the image and the desired end-use of the image. For example, a user intending to photograph landscapes would benefit from a different set of resources than a user intending to photograph sporting events. A user intending to provide images to a website would benefit from a different set of resources than a user intending to print physical copies of images or a user intending to apply images to a curved surface of a consumer product. Most consumers seeking to purchase cameras or other resources for producing images may lack specialized knowledge regarding the most suitable use of resources. As a result, users may make resource selections that result in an unsatisfactory user experience.

This disclosure describes systems, methods, and computer-readable media configured to access content data relating to one or more images that correspond to user preferences. From the content data associated with user-preferred images, one or more resources used to produce the images may be determined. Recommendations about these resources may then be provided to the user. The techniques described herein may be applied to still images, video images, or both.

Images received from a user, selected by a user, or determined from a user's device, browsing history, social networking platforms, or other platforms may be determined as user preference data. For example, a user may be presented with a plurality of images, and the user preference data may be used to determine a subset of images (e.g., one or more images) from the plurality of images.

In one implementation, one or more images may be received from a user, or a user may provide selections of existing images having characteristics the user may desire to duplicate. For example, the user may provide a set of their favorite images that they have produced themselves. In another example, the user may select images from a catalog having desired characteristics. In other implementations, images may be determined from a computer-readable storage medium (CRSM) associated with a user device (e.g., internal or remote data storage), a browsing history associated with a user, one or more social networking platforms associated with the user, and so forth. One or more of the images determined as user preference data may have content data associated therewith.

Content data may include both image data and resource data. The image data may include data corresponding to the images themselves, such as the bitmap of the image. The resource data may include data indicating one or more resources used to produce a corresponding image. One example of resource data may include image metadata, such as exchangeable image file format (Exif) data, stored in association with the image. For example, the resource data may include the date and time an image was produced, the location at which an image was produced, the make and model of a camera, lens, or other equipment used to produce the image, or one or more configuration values or other features associated with a camera. Configuration values may include orientation (rotation), aperture size, shutter speed, focal length, metering mode, film speed, color balance, exposure, whether a flash was actuated, a flash setting, and so forth.

From the content data, a determination of one or more resources associated with the user preference data (e.g., the subset of images provided by, selected by, or determined from a user) may be made. The resources associated with the image(s) may be output to the user, such as in the form of a recommendation. As such, implementations described herein may enable a user to provide or select one or more images, or for one or more images to be determined from a user's storage, browsing history, or social networking accounts, and to receive a recommendation of one or more cameras or other resources that correspond to the subset of images preferred by the user.

In some implementations, the output data may include multiple resources or sets of resources. One or more of the resources, or sets of resources, may have a different cost. The output data may provide a user with sets or groups of resources appropriate for different cost constraints. For example, a user may select a set of extremely detailed images produced using a costly camera and lens. Responsive to this selection, the output data may include both the costly camera and lens and a less costly camera and lens to provide the user with options appropriate for different cost constraints. The less costly camera and lens may be incapable of producing images of an identical quality to the user-selected images, but may be capable of producing similar types of images. A user would then be able to prioritize cost or image quality by selecting from multiple sets or groups of resources.

In other implementations, a cost constraint may be received from a user, and if the cost of one or more determined resources exceeds the cost constraint, additional user preference data or content data may be used to determine additional resources to include in the output data. For example, images having a type or quality similar to those selected by a user may not be producible using resources that do not exceed the cost constraint. However, additional images or information regarding characteristics of images selected by the user may be used to determine an alternate set of resources that do not exceed the cost constraint. For example, additional information may include a desired use for produced images. Continuing the example, a user may indicate a desire to provide images to an online medium rather than printing the images using a printer. In this example, a less costly camera that is incapable of producing extremely high-resolution images may still be used to produce images suitable for display via an online medium. Other constraints, such as limits on size, weight, style, and so forth, may be received and used to filter the determined resources that are provided as output.

Implementations described herein may also be used to determine configuration values of one or more resources, the layout or placement of resources, techniques by which one or more resources may be used, or one or more modifications or other processes that may be applied to an image after generation thereof. For example, from the content data associated with an image, one or more configuration values of a camera or other resources used to produce the image may be determined. In some implementations, the determined configuration value(s) may be used to configure an item that is purchased via a recommendation provided to a user. In other implementations, a user may currently possess one or more resources, and determined configuration values may be used to automatically configure the one or more resources.

In some implementations, layout data, relating to the physical placement or arrangement of one or more resources, relative to other resources or relative to other objects, may be determined from the content data. For example, some images may be produced using a specific arrangement of flashes or reflectors, relative to a camera. Some images may be produced using a specific placement of resources relative to walls, furniture, plants, or sources of natural or ambient light. Resource data associated with an image may include a schematic diagram or other representations of a layout of resources stored in association with the image. In some implementations, location data, such as data obtained from a Global Positioning System (GPS) receiver or similar equipment, may be present in the resource data and used to determine information regarding a layout of resources or other objects. For example, the ambient light present at a determined location at a given time may be known. The position of fixed objects, such as walls or terrain features, relative to the determined location may also be known. In other implementations, layout data may be determined from the image data. For example, use of image recognition software or similar techniques may determine information regarding the position of one or more resources relative to one another that are used to produce the image. Continuing the example, placement of a light source may be determined by analyzing shadows present in the image.

In some implementations, data indicative of a technique associated with one or more of the resources used may be determined, either from the resource data, or from the image data, itself (e.g., by performing image analysis). In other implementations, data indicative of a technique associated with one or more resources may be obtained from review data associated with the one or more resources. For example, the text of one or more user reviews may be processed to determine language that describes techniques by which a resource may be used to provide one or more characteristics to an image. Continuing the example, a user may generate a review explaining one or more techniques by which the user operated a resource, and the quality of the images produced using the techniques. This review may be processed to determine language relevant to techniques by which a resource may be used, and the determined language may be provided as output to other users. Similarly, in some implementations, data indicative of modifications performed on a produced image may be determined from the resource data, or from the image data.

The systems described in this disclosure may be used to determine user preference data indicative of user-preferred images. Using content data associated with the user preference data, the resources used to produce the user-preferred images, configuration values of those resources, layout data relating to those resources, techniques by which those resources were used, or modifications made to the images after production thereof, may be determined. This data may be provided as output to a user or provided to one or more resources associated with the user. The user may thus be assisted in producing images of a type or having characteristics similar to their user-preferred images.

FIG. 1 depicts a system 100 usable within the scope of the present disclosure. A first user 102(1) associated with one or more resource(s) 104 (e.g., a camera, lens, and flash) configured to produce one or more images, is depicted. The resource(s) 104 are shown acquiring one or more images of one or more objects. One or more of the images may have content data 106 associated therewith. The content data 106 may include image data 108 representative of the image itself, resource data 110 indicative of one or more resources 104 used to produce the images, and other types of data. The resource(s) 104 may include any number or type of cameras, lenses, flashes, filters, reflectors, output devices such as printers or display devices, output media such as paper or consumer products, software, or other tools usable to produce an image. When used to produce an image, the resource(s) 104 may produce the content data 106 that includes both the image data 108 and the resource data 110. The image data 108 may include data relating to the images such as a bitmap. The resource data 110 may include metadata associated with the images or the resources(s) 104 used to produce the images, such as Exif data or another format.

The resource data 110 may include data generated and stored in association with the images by the resource(s) 104, as well as data input by the user 102(1). For example, when actuated to produce an image, the resources 104 may generate resource data 110 including one or more of: an indication of an identity (e.g., type, make model, version, and so forth) of the resources 104, one or more configuration values of the resources 104, one or more items of information determined from the resources 104, and so forth. Continuing the example, the resource data 110 may include one or more of the date and time an image was produced, the location at which an image was produced, the make and model of a camera, lens, or other equipment used to produce the image, one or more configuration values associated with a camera or other resource, an orientation (rotation), aperture size, shutter speed, focal length, metering mode, film speed, color balance, exposure, whether a flash was actuated, a flash setting, and so forth. In some implementations, the resource data 110 also include data input by the user 102(1). For example, a user 102(1) may input copyright information, an identity of the user 102(1), information regarding the subject of an image, information regarding a layout or technique by which a resource 104 was used, information regarding a modification made to a produced image, information regarding the medium by which an image was output, and so forth.

FIG. 1 depicts the resource(s) 104 providing the content data 106 to one or more servers 112 via one or more networks 114. For example, the resource(s) 104 may be in direct or wireless communication with the server(s) 112, or in communication with one or more computing devices configured to communicate with the server(s). The network(s) 114 may include public networks such as the Internet, private networks such as an institutional or personal intranet, or a combination thereof. The network(s) 114 may include any type of wired or wireless network, including, but not limited to, a personal area network (PAN), local area network (LAN), wide area network (WAN), and so forth. The network(s) 114 may communicate using Ethernet, Wi-Fi™, Bluetooth®, ZigBee®, 3G, 4G, LTE, Z-Wave, or other technologies.

A content data processing module 116 in the server(s) 112 may be used to process one or more of the image data 108, the resource data 110, or other types of data included within the content data 106. From the content data 106 associated with an image, the content data processing module 116 may determine one or more of the resources 104 used to produce the image, configuration values of the resources, layout data, techniques by which the resources were used, or post-production modifications made to the image.

For example, the content data processing module 116 may include image analysis software, such as facial or object recognition software, usable to determine characteristics of the images from the image data 108. Continuing the example, the content data processing module 116 may determine a type corresponding to one or more images (e.g., a landscape, a portrait, an action shot, a night image, and so forth). The type of the image may be determined through the recognition of faces or objects in the image, the determination of certain colors or intensities thereof, the determination of light, shadows, or reflectivity of depicted objects, and so forth. The content data processing module 116 may determine various characteristics of the image from the image data 108, such as one or more of: an image size, sharpness, resolution, color balance, exposure, whether a flash was actuated, and so forth.

In some implementations, the content data processing module 116 may include image recognition software. For example, from image data 108 associated with an image, the content data processing module 116 may recognize the image, itself. Continuing the example, the image data 108 may correspond to an image from a known publication. The image may include an electronic image, or in some implementations, the image may include a physical image, such as an image printed in a poster, a book, a magazine, and so forth. Data corresponding to the known image and one or more resources 104 used to generate the image may thereby be determined by identifying the image. In some implementations, the image may include a machine readable code, such as a barcode, a matrix bar code, and so forth, associated therewith. The content data processing module 116 may identify the image by identifying the machine readable code and accessing data associated with the machine readable code. In other implementations, information adjacent to or associated with an image may be used to identify the image. For example, an image from a publication may include text, a header, a footer, page numbers, captions, other images, and so forth adjacent thereto. The content data processing module 116 may be used to process at least a portion of the information adjacent to or associated with the image to identify the image.

The content data processing module 116 may determine one or more characteristics of an image using the resource data 110. For example, the content data processing module 116 may be configured to determine a format (e.g., Exif) of the resource data 110. From the resource data 110, the content data processing module 116 may determine one or more of resource identities, configuration values, layout data, techniques of use, post-processing modifications made to the image after its production, data input by a user 102(1), and so forth.

FIG. 1 depicts a second user 102(2), associated with a user device 118, accessing the server(s) 112. The user device 118 may include, without limitation, mobile devices, smartphones, set-top boxes, tablet computers, personal computers, wearable computers, or other types of computing devices. In some implementations, resources 104 may be integral with a user device 118. For example, the resource 104 may include a camera that is integrated within a smartphone.

The second user 102(2) may provide a user query 120 to the server(s) 112. In some implementations, the user query 120 may include one or more filters or keywords used to search a plurality of images based on the category or content thereof. For example, the user 102(2) may input a user query 120 to locate landscape images, images of birthday parties, images of children, images containing selected colors, and so forth. In other implementations, the user query 120 may simply include a general query regarding a recommendation of resources 104. For example, accessing a website or application used to generate a recommendation of resources 104 may constitute a user query 120. In some implementations, the user query 120 may include an indication of the manner in which the user 102(2) intends to print, display, or output one or more images.

Responsive to receipt of the user query 120, the server(s) 112 may provide the image data 108 to the user device 118 to enable viewing or selection of one or more images by the user 102(2). The image data 108 may be associated with one or more images that correspond to the user query 120. Through the selection of one or more of the images represented by the image data 108, the user device 118 may be used to generate and provide user preference data 122 to the server(s) 112. In other implementations, the user preference data 122 may include one or more images provided by the user device 118, or determined from the user device 118, such as by determining images from the browsing history or one or more CRSM associated with the user device 118 or in networked communication with the user device 118. As such, the user preference data 122 may be indicative of a subset of a larger set of images.

A user preference data processing module 124 may be used to receive and process the user preference data 122. In some implementations, the user preference data processing module 124 may be configured to receive images provided from a user device 118. In other implementations, the user preference data processing module 124 may be configured to provide images to a user device 118 and receive selections or ratings of images therefrom. In still other implementations, the user preference data processing module 124 may be configured to determine one or more images present in a CRSM in communication with the user device 118, from a browsing history associated with the user device 118, or from a social networking platform or other network-based medium associated with the user 102(2). Images determined from a CRSM, a browsing history, or a network-based medium associated with the user 102(2) may include ratings or another manner of selection associated therewith. The ratings may be used to determine which of the images from the CRSM, browsing history, or network-based medium constitute the user preference data 122.

The content data processing module 116 may determine the resources 104 used to produce the images that correspond to the user preference data 122. The resource data 110 associated with the resources 104 may be provided from the server(s) 112 to the user device 118, or used to generate output data 126 indicative of the resource data 110. In some implementations, the output data 126 may include a recommendation of one or more resources 104 that correspond to images determined from the user preference data 122. In other implementations, the output data 126 may include a recommendation of one or more configuration values for the resources 104 that correspond to the user preference data 122. For example, a resource 104 purchased by a user 102 may be configured using the recommended configuration values prior to providing the resource 104 to the user 102. In some implementations, a resource 104 in possession of the user 102 may be configured automatically using the configuration values received from the server(s) 112. In other implementations, the output data 126 may include a recommended layout of one or more resources 104, recommended techniques by which one or more resources 104 may be used, and so forth.

For example, FIG. 1 depicts the image data 108 including four images, having content data 106 associated therewith. The user preference data 122 is shown including a selection of two of the images. Responsive to the selection of two images by the user device 118, output data 126 containing an indication of the resource data 110 associated with the selected images is provided to the user device 118. The output data 126 may include a recommendation of the resources 104 used to produce the images corresponding to the user preference data 122.

Figure 2:
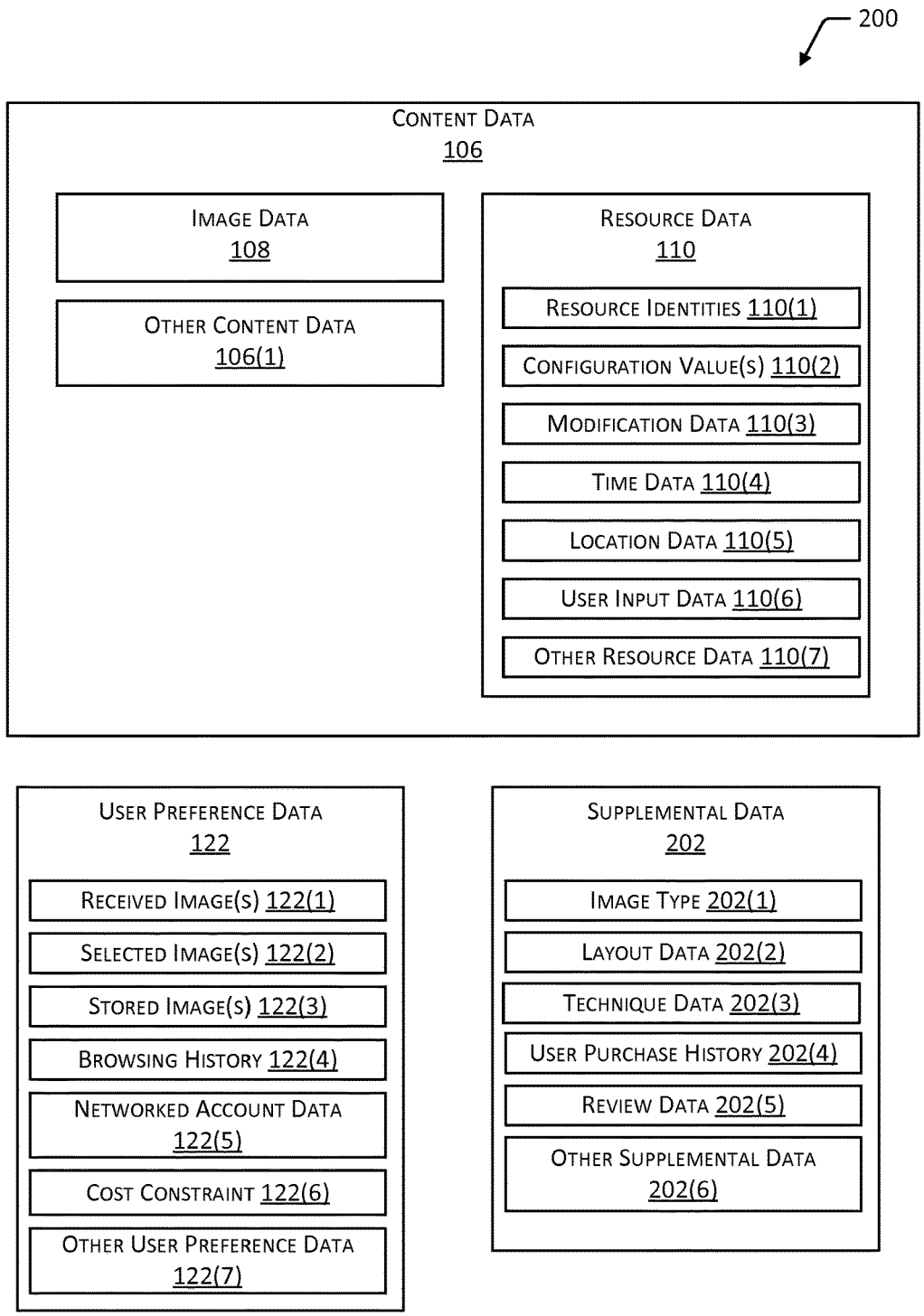
FIG. 2 is a block diagram illustrating examples of content data, user preference data, and supplemental data that may be used to determine the resources used.

FIG. 2 is a block diagram 200 illustrating example implementations of the content data 106, user preference data 122, and supplemental data 202 usable with the system 100 shown in FIG. 1.

The content data 106 may include data used to define or generate an image, and other data stored in association with the image. The content data 106 may include image data 108, which may include data relating to the characteristics of the image, such as the size and resolution thereof, the characteristics of pixels therein, and so forth. For example, the image data 108 may comprise the information indicative of the picture acquired by the camera. The content data 106 may also include resource data 110, which may include data relating to the resources used to produce an image, configuration values thereof, and other data stored in association with the image. For example, resource data 110 may include image metadata (e.g., Exif data, or another format for standardized tags, such as date and time, camera settings, an image thumbnail, descriptions, and copyright information). Other content data 106(1) may also be present, depending on the type of image, the characteristics of the resources 104 used to generate the image, and so forth.

The image data 108 may include any manner of data usable to generate an image or video. For example, the image data 108 may include data indicative of the size, resolution, or number of pixels present in a corresponding image. The image data 108 may further include data corresponding to pixel locations, such as a pixel map, an index to a colormap, and so forth. The image data 108 may also include color data, which may include values corresponding to the color or intensity of one or more pixels of the image. Image data 108 may further include data for generating three-dimensional images, multi-spectral images, videos (which may include both sequential images and audio data), and so forth. The image data 108 may be processed, such as through use of image analysis or image recognition software, to identify characteristics of one or more images. The identified characteristics of images that correspond to user preference data 122 may be used to generate recommendations of one or more resources 104 suitable for production of images having similar characteristics.

The resource data 110 may include one or more resource identities 110(1), such as the make, model, manufacturer, or other identifier of a camera, lens, flash, or reflector, printer, a type or version of software, or other resources 104 used to produce a corresponding image. The resource data 110 may also include one or more configuration values 110(2) for one or more of the resources 104. For example, resource data 110 may include an indication of an orientation (e.g., rotational position), color positioning (e.g., YCbCr), color space (e.g., sRGB), color balance, saturation, image dimensions, pixel dimensions, compression of the image, resolution of the image, exposure time, exposure bias, focal ratio, focal length, aperture value, shutter speed, light sensitivity (e.g., an International Standards Organization (ISO) rating), whether a flash was actuated, flash settings, and so forth. The resource identities 110(1) or configuration value(s) 110(2) may be used to generate recommendations of one or more resources 104, and corresponding configuration values 110 (2) thereof, suitable for production of images similar to those associated with the resource data 110. In some implementations, configuration values 110(2) associated with one or more images may be automatically used to configure a resource 104. In other implementations, configuration values 110(2) may be provided as output data 126 for use by a user 102 in configuring a resource 104 manually.

In some implementations, the resource identities 110(1) or configuration value(s) 110(2) may be determinable from the image data 108. For example, by performing image processing on image data 108, it may be possible to determine color characteristics, exposure, focal length, resolution, and so forth, and to determine one or more possible resource identities 110(1) or configuration values 110(2) that may correspond to the image data 108.

The resource data 110 is also shown including modification data 110(3). Subsequent to or concurrent with the production of an image, the image may be subjected to one or more image editing processes. For example, one or more portions of an image may be enhanced to remove red-eye, increase or decrease sharpness, zoom, pan, or crop the image, alter the size of the image, or alter the orientation of the image. Similarly, an image may be edited to modify the color or brightness value of one or more pixels, reduce noise in an image, remove or conceal visible features or objects, alter an image perspective or adjust for lens distortions, and so forth. An image printed or otherwise applied to a curved or irregularly shaped surface or medium, such as the exterior of a consumer product, may be modified to correct or prevent the appearance of irregularities caused by the shape of the surface or medium. Modification of images may result in changes to the resource data 110 stored in association therewith, and the modification data 110(3) may include information indicative of one or more image editing processes that were performed.

In some implementations, the modification data 110(3) may indicate that one or more modifications were made to an image; however, the specific modifications that were made may not be determinable. In other implementations, all or a portion of the modification data 110(3) may be determinable from the image data 108. For example, image analysis may be used to determine repetition of pixels, the presence of halos or other artifacts, irregular shadows, reflections, perspective lines, and so forth.

The resource data 110 may also include time data 110(4), which may include an indication of the date, the time, or both the date and time at which an image was produced. For example, a resource 104 may have an internal clock or may communicate with a device associated with a clock, such that the date, time, or date and time the resource 104 is actuated to produce an image may be stored in association with the image. In some implementations, the time data 110(4) may be determined from the image data 108. For example, using image analysis, the presence and position of light, shadows, and reflections may enable an approximate time to be determined from an image.

The resource data 110 may further include location data 110(5), which may include an indication of the location at which an image was generated. For example, a resource 104 may have one or more location sensors associated therewith, or may be in communication with a device associated with location sensors. When the resource 104 is actuated to produce an image, data corresponding to the location at which the image was produced may be stored with the image. For example, location data 110(5) may be stored in one or more CRSM in networked communication with the resource 104, a server 112, a user device 118, or other computing devices. Usable location sensors may include radio navigation-based systems, such as terrestrial or satellite-based navigational systems. Satellite-based navigation systems may include one or more of a Global Positioning System (GPS) receiver, a global navigation satellite system (GLONASS) receiver, a Galileo receiver, an Indian Regional Navigational Satellite System, and so forth. In some implementations, the location data 110(5) may be determined from the image data 108. For example, through use of image recognition, one or more features depicted in an image may be determined, and a body of data may be queried to determine a location that corresponds to the determined features.

The resource data 110 is also shown including user input data 110(6). A user 102 using a resource 104 to produce an image may generate user input data 110(6) using the resource 104, or another computing device in communication therewith. The user input data 110(6) may be stored with the image. For example, a user 102 may provide user input data 110(6) regarding the resource identities 110(1) of one or more resources 104 used, configuration values 110(2) of the resources, or modification data 110(3) regarding any modifications made to the image. A user 102 may similarly input time data 110(4) or location data 110(5). User input data 110(6) may be present in addition to or in lieu of any resource data 110 produced by the resource(s) 104 or determined form the image data 108. In some implementations, a user 102 may provide user input data 110(6) regarding items other than those included in the resource data 110 or the image data 108. For example, a user 102 may provide user input data 110(6) regarding a type of image such as a landscape, an action shot, a portrait, and so forth, a subject of the image, an identity of the user 102, or copyright information. Continuing the example, a user 102 may provide, information regarding a layout of one or more resources 104 or a technique by which one or more resources 104 was used, reviews or other information regarding the resources 104, and so forth.

Other resource data 110(7) may also be present. Depending on the type or characteristics of the image produced, or of the resource(s) 104 used, various items of data relevant to the resources 104 may be stored in association with the image. By way of example, other resource data 110(7) may include metadata associated with an image that indicates resolution of an image along various axes, a unit of measurement corresponding to the resolution, a compression method, an exposure program used, a version of a metadata (e.g., Exif) format used, digitized and original time data 110(4), a metering mode, a graphic file format used and the version thereof, and so forth.

The user preference data 122 may include data received from a user 102 or determined from one or more user devices 118, CRSM, or networked platforms associated with a user 102. The user preference data 122 may be indicative of images that a user 102 may prefer or seek to emulate by purchasing resources 104 or using existing resources 104 to produce images.

The user preference data 122 may include received images 122(1), which may include any manner of content data 106 associated with an image that is received from a user 102 through any medium. For example, a user 102 may provide images having characteristics indicative of images that the user 102 desires to produce, from storage associated with a user device 118, from remote (e.g., cloud-based) storage, and so forth. Content data 106 associated with the received images 122(1) may be used to determine resources 104, configuration values 110(2), layouts, techniques of use, modification data 110(3), and so forth, that may be provided to a user 102 as output data 126.

The user preference data 122 may further include selected images 122(2), which may include content data 106 associated with any image for which a user 102 has indicated a selection or preference. For example, to determine user preference data 122, the user 102 may be provided with a plurality of images and prompted to select one or more of the images having characteristics that the user 102 may seek to emulate. Content data 106 associated with the selected images 122(2) may be used to determine output data 126 for provision to the user 102.

In some implementations, the selected images 122(2) may include images for which a user 102 has provided a rating. For example, a user 102 may be permitted to rate images stored in a CRSM associated with a user device 118, images viewed on a social networking platform or other networked platform, and so forth. Images having a rating equal to or exceeding a threshold rating may be determined as user preference data 122.

The user preference data 122 may also include stored images 122(3), which may include one or more images stored in a CRSM associated with a user 102. Usable CRSM may include fixed or removable data storage media, as well as remote, networked, or distributed data storage media, such as cloud-based storage. In some implementations, each stored image 122(3) retained in storage associated with a user 102 may be determined as user preference data 122 and used to generate output data 126 relating to one or more resources 104. In other implementations, the stored images 122(3), or other data associated with the user 102, may be processed to determine one or more of: a length of time for which one or more images was viewed, a number of times one or more images was viewed, a number of times one or more images was provided to other users 102 or computing devices, a number of times one or more images was discussed in a communication (e.g., a SMS communication, an e-mail, a communication associated with a social networking platform), a rating provided to one or more of the images, and so forth. For example, stored images 122(3) viewed for a length of time that exceeds a threshold time, accessed a number of times that exceeds a threshold number, provided to other users 102 or devices a number of times that exceeds a threshold number, having a rating that exceeds a threshold rating, and so forth, may be determined as user preference data 122. Content data 106 associated with stored images 122(3) may be used to determine recommendations of resources 104, configuration values 110(2), and so forth, to be provided as output data 126.

The user preference data 122 may also include a browsing history 122(4). A browsing history 122(4) associated with a user 102 may include one or more images accessed by a user 102 using a user device 118. In some implementations, each image associated with a browsing history 122(4) may be determined as user preference data 122. In other implementations, the browsing history 122(4) may be processed to determine a length of time for which one or more images was viewed, a number of times one or more images was viewed, a number of times a link associated with one or more images was provided to other users 102 or computing devices, a number of times one or more images was discussed in a communication (e.g., a SMS communication or an e-mail), and so forth. Images associated with the browsing history 122(4) viewed for a length of time that exceeds a threshold time, accessed a number of times that exceeds a threshold number, provided to other users 102 or devices a number of times that exceeds a threshold number, and so forth, may be determined as user preference data 122. Content data 106 associated with images in the browsing history 122(4) may be used to determine output data 126 regarding one or more resources 104.

The user preference data 122 may include networked account data 122(5). The networked account data 122(5) may include images associated with one or more accounts of a user 102, such user accounts associated with social media platforms, network-based forums, and so forth. For example, a user 102 may provide images to a social media platform for access by others, or a user 102 may access images provided by others. In some implementations, a user 102 may select or rate images from a social media platform or similar medium and indicate interest or disinterest in the selected images. Images provided to a social medial platform or other network-based platform by a user 102, images selected by a user 102 as being of interest, or images having a rating that exceeds a threshold rating may be determined as user preference data 122. In other implementations, networked account data 122(5) may be processed to determine one or more of: a length of time for which one or more images was viewed, a number of times one or more images was viewed, a number of times a link associated with one or more images was provided to other users 102 or computing devices, a number of times one or more images was discussed in a communication (e.g., a SMS communication, an e-mail, a communication provided on a social media platform), and so forth. Images associated with the networked account data 122(5) viewed for a length of time that exceeds a threshold time, accessed a number of times that exceeds a threshold number, provided to other users 102 or devices a number of times that exceeds a threshold number, and so forth, may be determined as user preference data 122. Content data 106 associated with images in the networked account data 122(5) may be used to determine the output data 126.

In some implementations, the user preference data 122 may include a cost constraint 122(6). For example, a user may input a cost constraint 122(6) indicating one or more preferred costs not to be exceeded by the cost of acquiring or utilizing the one or more resources 104. For example, the user may set a dollar value not to be exceeded. In one implementation, a cost constraint 122(6) may be determined using a cost associated with resources 104 currently owned by a user 102. For example, a user 102 may indicate one or more resources 104 previously purchased, or resources 104 previously purchased by a user 102 may be determined from the user's 102 purchase history. The cost associated with the resources 104 previously purchased by the user 102 may be determined, such as from purchase history data. In other implementations, the cost constraint 122(6) may be based on the cost of the resources 104 previously purchased. For example, in the absence of a cost constraint 122(6) as input form the user, a cost constraint 122(6) within a selected percentage (e.g., 20 percent) of the cost of the previously purchased resources 104 may be automatically determined.

Multiple resources 104 may be determined from content data 106 associated with images that correspond to the user preference data 122. One or more of the resources 104 may include an associated cost. The cost constraint 122(6) may be used to determine one or more resources 104 that are excluded from the output data 126, or the order or manner in which one or more resources 104 are presented to a user 102. For example, resources 104 having a cost that exceeds the cost constraint 122(6) may be omitted from the output data 126, or in some implementations, such resources 104 may be deemphasized in the output data 126, such as by placement at the end of an ordered list.

Other user preference data 122(7) may also be present. For example, limitations relating to the size, weight, style, or other features or capabilities of one or more resources 104 may be received, and presentation of the output data 126 may be affected by one or more constraints. In some implementations, other user preference data 122(7) may include an intended use for produced images. For example, a user 102 may indicate a desire to provide produced images to an online medium, to print images on a physical medium (e.g., paper, film, a consumer product), and so forth.

FIG. 2 also depicts supplemental data 202. The supplemental data 202 may include data relevant to one or more resources 104, determined from sources other than the content data 106 or the user preference data 122. For example, supplemental data 202 may include instructional manuals, online forums, blogs, or guides, user reviews and ratings, or other sources of information corresponding to one or more types of resources 104, configuration values 110(2) of the resources 104, modification data 110(3), layouts, techniques of use, post-processing, and so forth.

The supplemental data 202 may include an image type 202(1). For example, absent user input data 110(6) corresponding to a type or category relating to an image (e.g., landscape, portrait, action, etc.), the type or category of an image may be inferred by performing image recognition. In some implementations, comments, reviews, or similar information provided (e.g., from one or more users) in association with an image may describe the image type 202(1), which may be determined therefrom. Due to the fact that one or more resources 104 may be exceptionally suited or unsuitable for producing images of certain types, the image type 202(1) may be used to determine the output data 126 provided to a user 102. Data corresponding to the image type 202(1) may also include data indicative of one or more characteristics of an image, such as image size or resolution, sharpness, color balance or other color data, brightness, effects of ambient light, and so forth.

The supplemental data 202 may include layout data 202(2), which may relate to the placement or position of one or more resources 104 relative to other resources, and to other objects. For example, some images may include a specific arrangement of one or more flashes or reflectors, relative to a camera, or a specific placement of resources 104 relative to walls, furniture, plants, or sources of natural or ambient light, to generate a specific result. While the resource data 110 may include a focal length (e.g., a distance between a camera and a photographed object), and location data 110(5), the resource data 110 may not include the specific position of each resource 104 used, and the position of other objects. In some implementations, one or more items of user input data 110(6) may include layout data 202(2), such as a schematic diagram illustrating the placement of resources 104 or other objects. In other implementations, the position of one or more resources 104 may be determined through use of image analysis. In some implementations, comments, reviews, or similar information provided in association with an image may describe the placement of resources 104 or other objects, from which the layout data 202(2) may be determined.

The supplemental data 202 may include technique data 202(3), which may relate to methods by which one or more resources 104 may be used to generate certain results. For example, an image having certain characteristics may be produced by actuating a flash for a certain length of time before taking a picture with a camera, by orienting a subject to face certain directions relative to the camera, and so forth. While the resource data 110 may include one or more flash settings, and the layout data 202(2) may include information relating to the placement or orientation of various resources 104 or other objects, in some implementations, the resource data 110 may not include information regarding techniques for using the resources 104. Technique data 202(3) may be determined from items of user input data 110(6), or from publicly available information regarding one or more resources 104, such as user manuals, comments, reviews, and so forth.

In some implementations, the supplemental data 202 may include user purchase history 202(4). For example, a user 102 may purchase one or more resources 104, thereby generating a purchase history 202(4). When an image produced by that user 102 is received, selected, or determined as user preference data 122, the purchase history 202(4) of the user 102 may be queried to determine resources 104 purchased by the user 102 that may be associated with the image.

The supplemental data 202 may further include review data 202(5). For example, the review data 202(5) may comprise comments, reviews, ratings, or other information regarding the one or more resources 104. Review data 202(5) may be processed to determine information that may facilitate identification of one or more resources 104, suitable configuration values 110(2) for the resources 104, modification data 110(3) corresponding to suggested modifications to produced images, technique data 202(3) or layout data 202(2) describing use thereof, and so forth.

Other supplemental data 202(6) may also be present. Data from any accessible source that includes information relating to one or more resources 104 may be determined to facilitate generation of output data 126 to a user 102.

Information about the one or more resources 104 may be determined using a variety of procedures. For example, a user 102 may use image editing software to perform a post-processing modification to an image, such as elimination of red-eye from one or more subjects. Use of this resource 104 may be determined by performing image analysis on the image data 108 associated with the image. Image analysis may determine the modification of one or more pixels of the image at the location of the subject's eyes. Use of this resource 104 may be determined through use of the resource data 110 associated with the image. For example, the resource data 110 may include modification data 110(3) indicative of the post-processing modification made to the image. The resource data 110 may include user input data 110(6) provided by the user 102, indicative of the post-processing modification. Use of this resource 104 may be determined from the supplemental data 202. For example, review data 202(5) from one or more sources of online content may include a description of resources 104 and post-processing modifications suitable for eliminating red-eye from images produced using a particular camera or other type of resource 104.

In another example, purchase history 202(4) of the user 102 may indicate that the user 102 recently purchased imaging editing software, indicating that the user 102 may have used this resource 104 to process the image. One or any combination of such procedures may be used to determine information regarding resources 104 used to produce images, configuration values 110(2) of the resources 104, layout data 202(2), technique data 202(3), modification data 110(3), and so forth.

Figure 3:
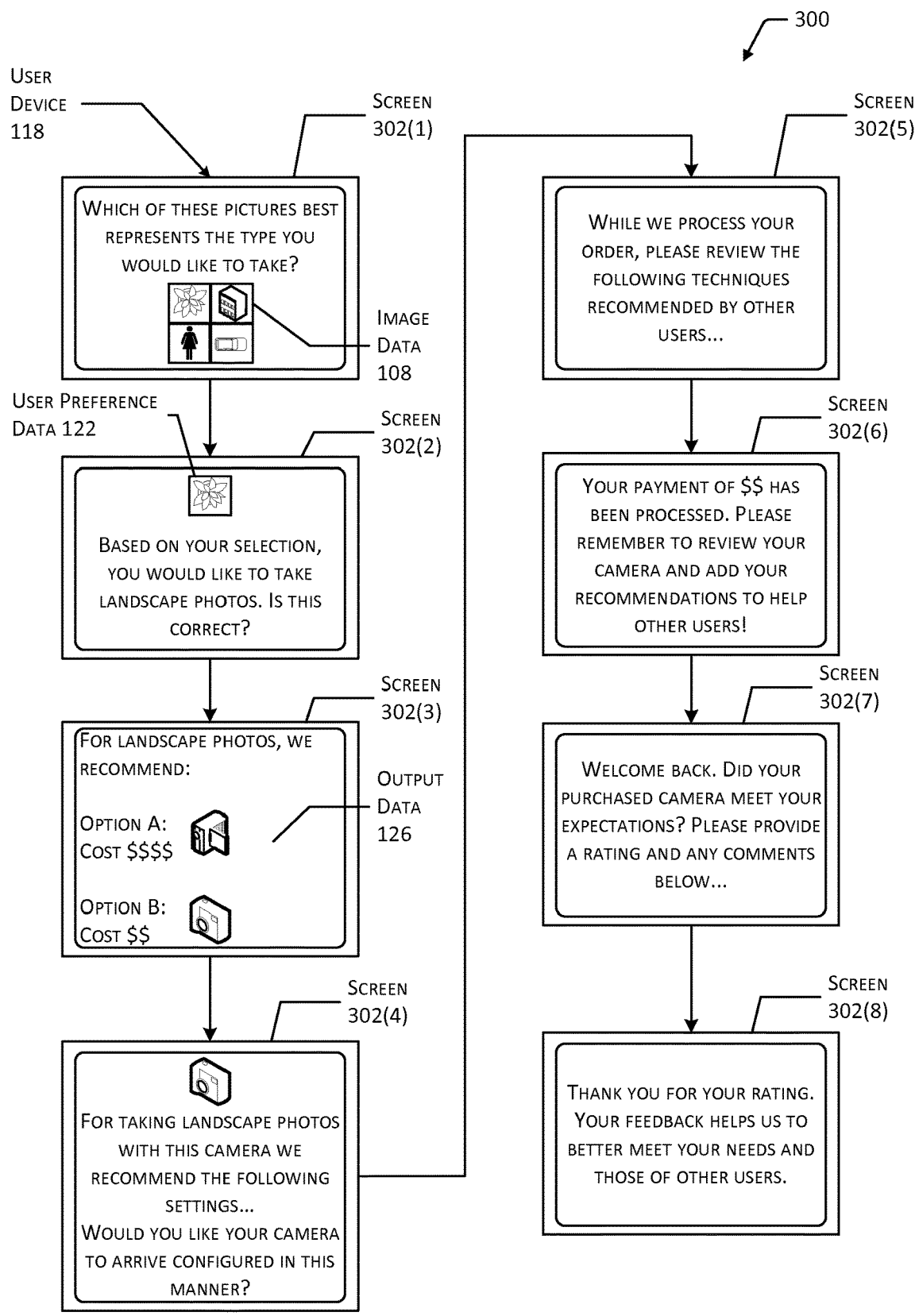
FIG. 3 depicts an example of a user interface for interaction between a user and a system for determining resources used to produce images.

FIG. 3 illustrates an implementation of a user interface 300 by which a user 102 may interact with a system 100 for determining resources 104 from content data 106 associated with images. Specifically, the user interface 300 is illustrated as a series of screens 302(1-8) that may be presented to a user 102 in sequence, responsive to receipt of input from the user 102. The screens 302(1-8) may be shown, for example, on a display associated with a user device 118.

The first screen 302(1) illustrates presentation of image data 108 to a user 102 of a user device 118. The depicted image data 108 includes a set of four images, one or more of which may be selected by a user 102. For example, the user 102 may be prompted to indicate images having characteristics that the user 102 desires to emulate when producing additional images. In some implementations, the user 102 may provide a user query 120 or other manner of prompt to filter or search for image data 108 corresponding to images of a specific type or category, images having specific content or characteristics, and so forth.

The second screen 302(2) depicts selection of one of the depicted images by a user 102. Selection of an image may generate user preference data 122. In the depicted implementation, the second screen 302(2) includes a textual prompt identifying a type corresponding to the selected image, and requesting confirmation of the identified type. In other implementations, a user 102 may provide images to a system 100, or the system 100 may determine images associated with a CRSM, networked platform (e.g., online content), or browsing history of the user 102. The depicted second screen 302(2) requests a confirmation from the user 102 regarding the selected image and a characteristic thereof. However, in some implementations, the second screen 302(2) may be omitted, and a recommendation of resources 104 may be provided subsequent to determination of the user preference data 122 without requiring further input by the user 102.

In other implementations, the second screen 302(2) may include a prompt requesting information regarding a user's 102 intended use of produced images. For example, a user 102 may be asked whether the user 102 intends to provide produced images to an online medium or to an electronic display device, to print physical copies of images having certain dimensions, to print images on consumer goods, and so forth. The intended medium by which the user 102 intends to output the produced images may affect the resources 104 recommended to the user 102. For example, one or more printers, types of paper or film, or other output media may be recommended to a user 102 intending to print physical copies of images. A camera capable of producing high-resolution images may be recommended to a user 102 intending to print physical copies of images having large dimensions.

The third screen 302(3) depicts output data 126 corresponding to one or more resources 104 associated with the selected image(s). The output data 126 includes two resources 104 (e.g., cameras), one or both of which may include associated cost data. For example, first cost data is shown associated with a first resource 104, depicted as "Option A: Cost $$$$." Second cost data is shown associated with a second resource 104, depicted as "Option B: Cost $$." In other implementations, a user 102 may provide a cost constraint 122(6), and resources 104 having a cost that exceeds the cost constraint 122(6) may be excluded from the output data 126 or deemphasized.

The fourth screen 302(4) depicts configuration recommendations corresponding to the selected resource(s) 104 being provided to the user 102. For example, recommended configuration values 110(2) for one or more uses of a particular resource 104 may be stored on a server 112 or other storage medium, or determined from one or more remote sources of data, such as review data 202(5), or other available sources. In the depicted implementation, the fourth screen 302(4) includes a prompt regarding whether a user 102 would prefer a purchased resource 104 to be configured using the configuration values 110(2) prior to providing the resource 104 to the user 102. In other implementations, determined configuration values 110(2) may be provided to an existing resource in possession of the user 102.

The fifth screen 302(5) depicts technique data 202(3) corresponding to selected resource(s) 104. The technique data 202(3) may be stored on a server 112 or other storage medium, or determined from one or more remote sources of data, such as review data 202(5), or other available sources. For example, an electronic manual describing methods by which recommended resources 104 may be provided based on the type or characteristics of the images in the user preference data 122 and the resources 104 recommended to the user 102. In other implementations, a physical (e.g., hardcopy) manual containing technique data 202(3) may be included with one or more purchased resources 104 or independently provided to a user 102 for use with preexisting resources 104. In still other implementations, technique data 202(3) may be accessible via a user device 118, such as through use of an application configured to access one or more sources of technique data 202(3). The user device 118 may be used to control or configure one or more resources 104 via communication therewith over one or more networks 114. Alternatively, the user device 118 may access technique data 202(3) or other supplemental data 202 and output the data to a user 102 for manual use with one or more resources 104. Layout data 202(2), depicting or describing physical placement of resources 104 and other objects to produce images of a desired type or having desired characteristics, may also be provided in lieu of or concurrent with the technique data 202(3). Review data 202(5) or other available sources may be processed via a machine learning system, such as an expert system, an artificial neural network, a Bayesian network, and so forth.

The sixth screen 302(6) confirms completion of a purchase transaction for one or more resources 104 and prompts the user 102 to provide reviews and recommendations for the benefit of future users.

The seventh screen 302(7) depicts a prompt requesting a rating or comments from a user 102 subsequent to purchase and use of one or more resources 104. For example, after using a camera or other resources 104 recommended to the user 102, and in some implementations, after using technique data 202(3) or layout data 202(2) provided to the user 102, the user 102 may provide a rating or review. The rating or review may indicate whether the resources 104, technique data 202(3), or layout data 202(2) adequately produced images having similar quality and characteristics to the images within the user preference data 122.

The eighth screen 302(8) confirms receipt of the rating or comments provided by the user 102. In some implementations, ratings, reviews, comments, and so forth may be used to weight future recommendations of resources 104 to other users 102. For example, if multiple users 102 provide a negative rating or other indications that one or more resources 104 are not suitable for producing certain types of images, subsequent recommendations may not recommend those resources 104 responsive to user preference data 122 including such images. Conversely, positive ratings and indications that one or more resources 104 successfully produced images having a quality equal to or exceeding that of the user preference data 122 may result in the recommended resources 104 being provided to users 102 more frequently in subsequent recommendations. Machine learning systems may be used to improve the accuracy of subsequent recommendations using such user behaviors, user ratings, user reviews, user purchases, and so forth.

Figure 4:
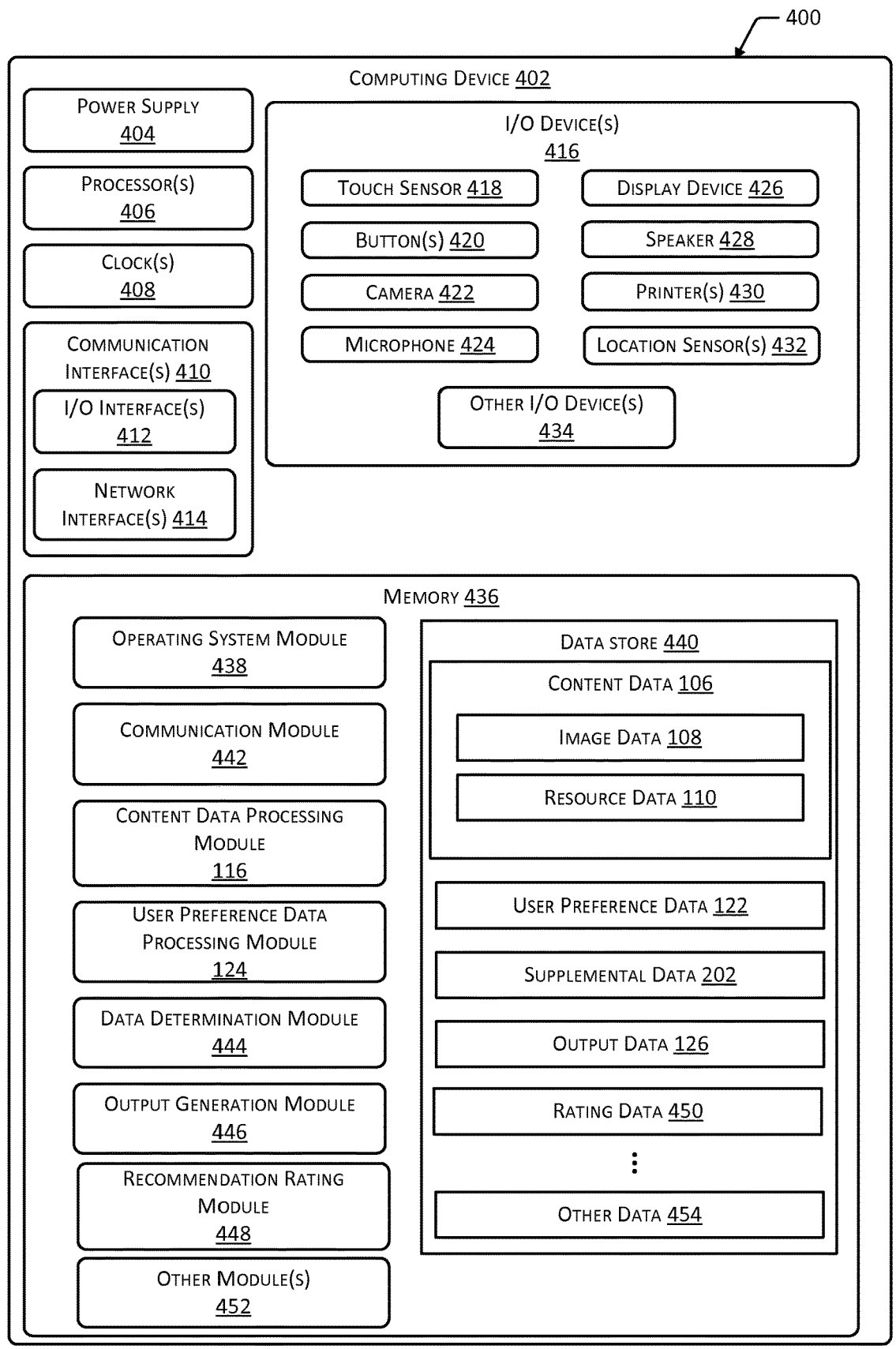
FIG. 4 is a block diagram illustrating a computing device within the scope of the present disclosure.

FIG. 4 illustrates a block diagram 400 of a computing device 402 configured to support operation of the system 100. The computing device 402 may include one or more servers 112, user devices 118, or other computing devices 402 in communication with the user devices 118 or with the server(s) 112.

One or more power supplies 404 may be configured to provide electrical power suitable for operating the components in the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clocks 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410 such as input/output (I/O) interfaces 412, network interfaces 414, and so forth. The communication interfaces 410 may enable the computing device 402, or components thereof, to communicate with other devices or components. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input device or output device associated with a user device 118, server 112, or other computing device 402 associated therewith. The I/O devices 416 may include input devices such as a touch sensor 418, one or more buttons 420, a camera 422, a microphone 424, a keyboard, a mouse, a scanner, and so forth. The I/O devices 416 may also include output devices such as a display device 426, a speaker 428, one or more printers 430, one or more haptic devices, and so forth. The I/O devices 416 may further include one or more location sensors 432, such as a Global Positioning Satellite (GPS) transmitter or receiver. In some implementations, the I/O devices 416 may be physically incorporated with the computing device 402 or may be externally placed. Other I/O devices 434, such as motion or orientation sensors, light sensors, and so forth may also be present.

The network interfaces 414 may be configured to provide communications between the computing device 402 and other devices, such as the I/O devices 416, routers, access points, and so forth. The network interfaces 414 may include devices configured to couple to one or more networks 114 including LANs, wireless LANs, WANs, wireless WANs, and so forth. For example, the network interfaces 414 may include devices compatible with Ethernet, Wi-Fi™, Bluetooth®, ZigBee®, Z-Wave, 3G, 4G, LTE, and so forth.

The computing device 402 may include one or more busses or other internal communications hardware or software that allows for the transfer of data between the various modules and components of the computing device 402.

As shown in FIG. 4, the computing device 402 may include one or more memories 436. The memory 436 may include one or more CRSM. The CRSM may be any one or more of an electronic storage medium, a magnetic storage medium, an optical storage medium, a quantum storage medium, a mechanical computer storage medium, and so forth. The memory 436 may provide storage of computer-readable instructions, data structures, program modules, and other data for the operation of the computing device 402. A few example modules are shown stored in the memory 436, although the same functionality may alternatively be implemented in hardware, firmware, or as a system on a chip (SOC).

The memory 436 may include one or more operating system (OS) modules 438. The OS module 438 may be configured to manage hardware resource devices such as the I/O interfaces 412, the network interfaces 414, the I/O devices 416, and to provide various services to applications or modules executing on the processors 406. The OS module 438 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 440 and one or more of the following modules may also be stored in the memory 436. The modules may be executed as foreground applications, background tasks, daemons, and so forth. The data store 440 may use a flat file, database, linked list, tree, executable code, script, or other data structure to store information. In some implementations, the data store 440 or a portion of the data store 440 may be distributed across one or more other devices including the computing devices 402, network attached storage devices, and so forth.

A communication module 442 may be configured to establish communications with one or more of other computing devices 402, such as user devices 118, servers 112, remote CRSM, one or more resources 104, sources containing supplemental data 202 or other devices. The communications may be authenticated, encrypted, and so forth.

The memory 436 may also store the content data processing module 116. The content data processing module 116 may be configured to receive content data 106 from one or more resources 104, user devices 118, or other computing devices 402, or to access content data 106 stored locally or on a remotely accessible CRSM. The content data processing module 116 may include image processing software, image recognition software, and so forth, usable to identify one or more features of the image data 108. For example, through use of image processing and image recognition techniques, in combination with other data, the content data processing module 116 may determine one or more of: an image resolution, an image type 202(1), resource identities 110(1), configuration values 110(2), modification data 110(3), layout data 202(2), technique data 202(3), and so forth.

The content data processing module 116 may also be configured to determine information from the resource data 110. For example, the content data processing module 116 may include text recognition software usable to determine information from textual items of resource data 110. In one example implementation, the image processing performed by the content data processing module 116 may be performed at least in part by using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. For example, the OpenCV library may be used to detect faces, determine a relative position of facial features such as eyes, mouth, nose, and so forth. In some implementations, the content data processing module 116 may be adapted to determine information from one or more recognized formats, such as Exif. For example, the content data processing module 116 may determine a format that corresponds to resource data 110, then determine information from resource data 110 regarding one or more resources 104, using the determined format.

The memory 436 is also depicted having the user preference data processing module 124 stored therein. The user preference data processing module 124 may be configured to receive content data 106 associated with images from a user device 118 or to present images to a user device 118 and receive selections therefrom. In some implementations, the user preference data processing module 124 may be configured to request, receive, or determine an identity of a user 102, and to access stored images 122(3) in one or more CRSM associated with the user 102, browsing histories 122(4) of the user 102, or networked account data 122(5) associated with the user 102.

The user preference data processing module 124 may be used, for example, to determine images preferred by one or more users 102, which may be stored as user preference data 122. The content data processing module 116 may then determine one or more resources 104, configuration values 110(2), and so forth that correspond to content data 106 associated with the user preference data 122.

The memory 436 is further depicted having a data determination module 444 stored therein. The data determination module 444 may be used to determine data relevant to one or more resources 104 not contained within the content data 106, such as the supplemental data 202. For example, the data determination module 444 may include any manner of image analysis, audio analysis, or text analysis software. The data determination module 444 may be configured to process image data 108 to determine an image type 202(1) of images corresponding to user preference data 122, or of other images from other sources. The data determination module 444 may determine layout data 202(2) or technique data 202(3) from content data 106 corresponding to user preference data 122 or to other images. The data determination module 444 may further determine image types 202(1), layout data 202(2), or technique data 202(3) from various discoverable sources, such as instruction manuals, review data 202(5), user recommendations, and so forth. The data determination module 444 may also be configured to determine a user purchase history 202(4) and to identify resources 104 therein. For example, a user 102 that has recently purchased a variety of resources 104 may subsequently produce images that are viewed, stored, or selected by one or more other users 102. The user purchase history 202(4) may facilitate determination of one or more resources 104 used to generate images that may not be determinable from the resource data 110.

An output generation module 446 may generate output data 126 for presentation to one or more user devices 118. For example, the output generation module 446 may provide output information corresponding to one or more determined resources 104. In some implementations, the output generation module 446 may determine a corresponding cost for one or more objects to be presented therewith. In other implementations, the output generation module 446 may query one or more cost constraints 122(6) or other constraints received with regard to a user 102, and modify the output data 126 to include, exclude, emphasize, or deemphasize one or more resources 104 based on the presence or absence of constraints.

A recommendation rating module 448 may receive and process rating data 450 provided by or determined from one or more users 102. The rating data 450 may be used to affect the resources 104 recommended in the output data 126. The rating data 450 may include explicit data, such as ratings received from users 102 regarding the suitability of one or more resources 104 for production of specific types of images or specific methods for outputting the images. The rating data 450 may include implicit data determined from user 102 behavior without requiring input from the user 102. For example, if a user 102 does not purchase one or more resources 104 recommended to the user 102, or if the user 102 returns the resources 104 shortly after the purchase thereof, this rating data 450 may cause these resources 104 to be omitted from subsequent recommendations to users 102. Conversely, the purchase of one or more resources 104 by a user 102, the detected use of one or more resources 104 by the user 102, and so forth may cause the resources 104 to be recommended to users 102 with greater frequency.

Other modules 452 may also be present in the memory 436. For example, video or audio processing modules may be used to determine resources 104 used to produce video or audio data. Specific modules may be configured for interaction with various social networking platforms or other sources of networked account data 122(5). Other modules 452 may include modules associated with machine learning, such as inference engines. Other data 454 may include size constraints, style constraints, or constraints regarding one or more features of a resource 104 that may affect generation of the output data 126. Other data 454 may include data associated with machine learning, such as one or more knowledge bases, machine learning algorithms, and so forth.

In different implementations, different computing devices 402 may have different capabilities or capacities. For example, the server(s) 112 may have significantly more processor 406 capability and memory 436 capacity compared to the user device(s) 118.

Figure 5:
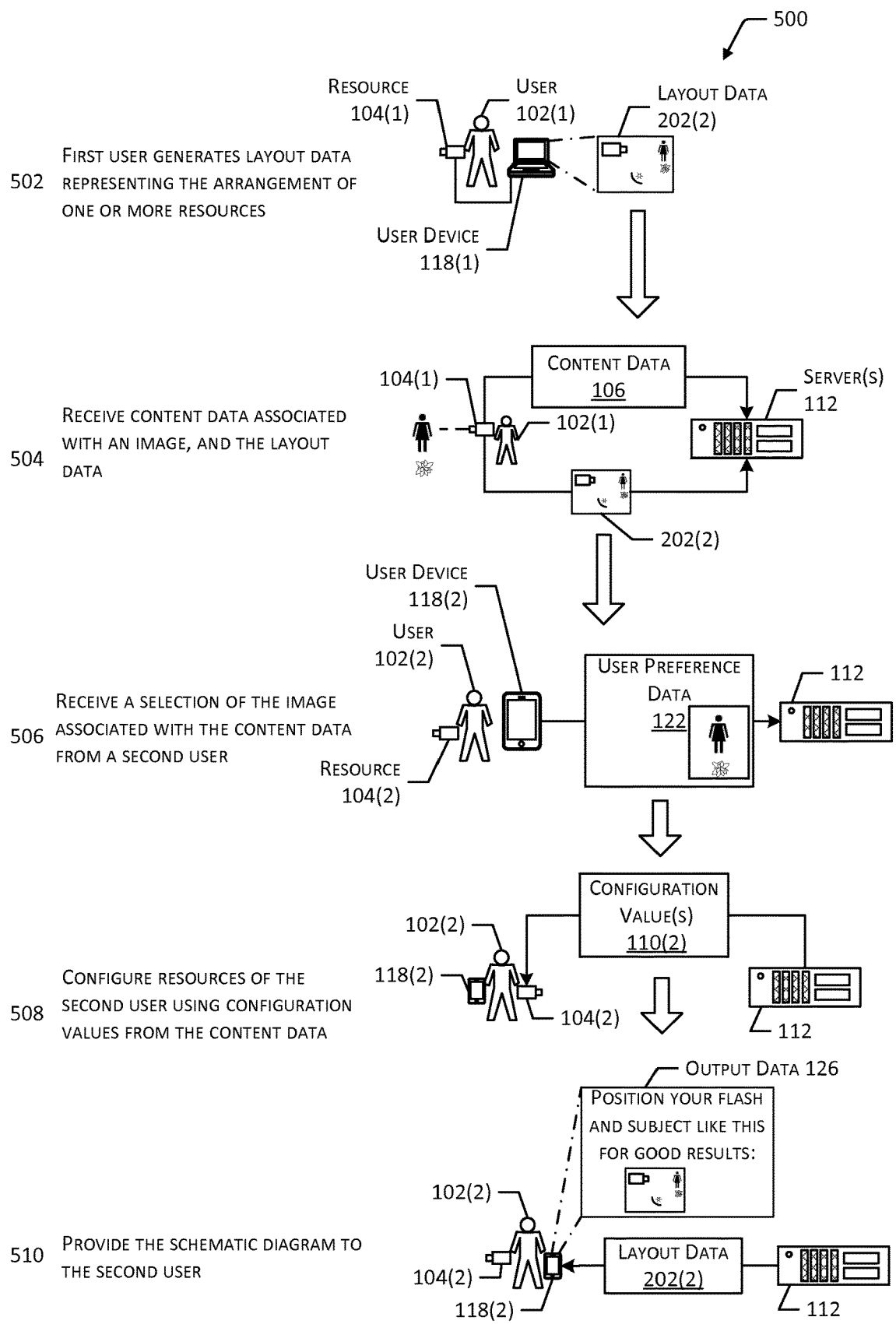
FIG. 5 illustrates a scenario for receiving and providing layout data corresponding to the use of one or more resources.

FIG. 5 illustrates a scenario 500 in which layout data 202(2) generated by a first user 102(1), and content data 106 associated with a selected image, may be provided to a second user 102(2). At 502, a first user 102(1) generates layout data 202(2) (e.g., a schematic diagram) representing the arrangement of one or more resources 104(1). For example, FIG. 5 depicts the user 102(1) in possession of a camera. A first user device 118(1) (e.g., a laptop computer) may be used to generate the layout data 202(2). In other implementations, the resource 104(1) may include an interface that may be used to generate the layout data 202(2). The layout data 202(1) may include, for example, a schematic diagram illustrating relative positions between multiple resources 104 (e.g., a camera, flash, and reflector) as well as between the resources 104 and other objects, such as the subject, walls, or other objects in an area.

At 504, content data 106 associated with an image, and the layout data 202(2) may be received, e.g., by one or more servers 112. For example, the user 102(1) is shown acquiring an image of a subject using the resource 104(1). The resource 104(1), or another computing device 402 in communication therewith, such as the user device 118(1), may provide the content data 106 and the layout data 202(2) associated with the produced image to the server(s) 112.

At 506 a second user provides a selection of the image associated with the content data 106. The second user 102(2) is depicted having a second resource 104(2), shown as a camera of the same or similar type as the first resource 104(1). A second user device 118(2) may be used to indicate a selection of one or more images. The selection may be provided to the server(s) 112 and stored as user preference data 122.

At 508, the resources 104 of the second user 102(2) may be configured using configuration values 110(2) from the content data 106 associated with the selected image. For example, the server(s) 112 or other associated computing devices 402 may determine the content data 106 associated with one or more selected images. From the content data 106, one or more configuration values 110(2) may be determined. As described previously, the resource data 110 associated with an image may include indications of one or more configuration values 110(2). In some implementations, the image data 108 associated with an image may be processed, and characteristics of the image indicative of one or more configuration values 110(2) may be determined.

At 510, the schematic diagram may be provided to the second user 102(2). FIG. 5 depicts the layout data 202(2) provided from the server(s) 112 to the second user device 118(2). Output data 126 corresponding to the layout data 202(2) may be generated using an output device of the second user device 118(2) or of the resource 104(2). For example, an output generation module 446 within the server(s) 112 or the user device 118(2) may be used to generate and display the output data 126.

In some implementations, the user 102(2) may edit the received layout data 202(2). For example, due to space constraints or other characteristics of a location, resources 104, or other objects associated with the second user 102(2), at least a portion of the schematic diagram in the layout data 202(2) may not be usable by the user 102(2). Using the user device 118(2) or the resource 104(2), the user 102(2) may edit the layout data 202(2), such as by modifying the position of one or more resources 104 or other objects, adding resources 104 or objects to the layout data 202(2), or removing resources 104 or objects therefrom. The edited layout data 202(2) may then be provided to the server(s) 112. Using the edited layout data 202(2), the server(s) 112 may determine one or more additional configuration values 110(2) for the resource 104(2) that correspond to the edited layout data 202(2). The additional configuration values 110(2) may be provided to the resources 104(2). In other implementations, the additional configuration values 110(2) may be output to a user 102 and used to configure one or more resources 104 manually.

Figure 6:
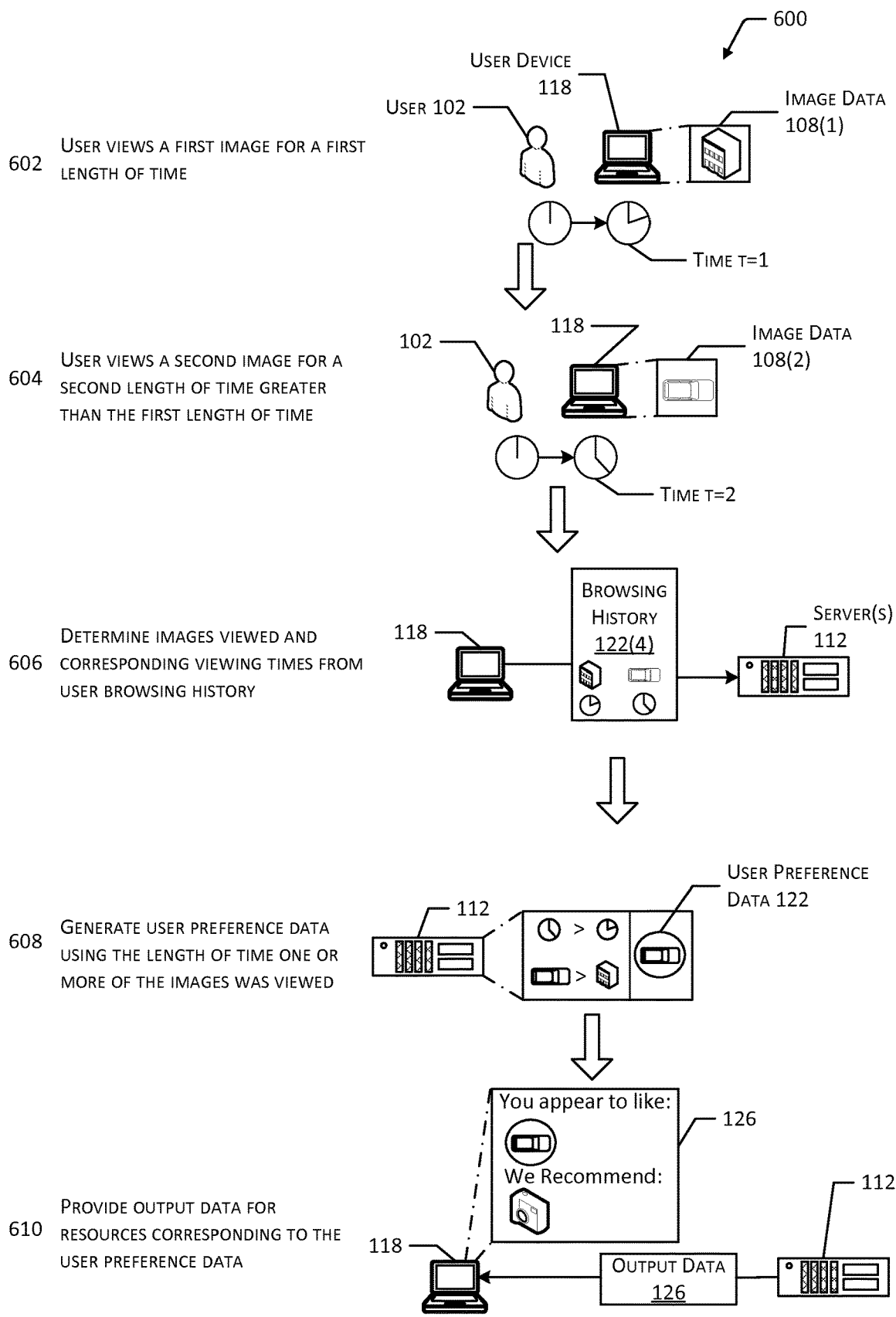
FIG. 6 illustrates a scenario for determining and providing resource data to a user based on a browsing history associated with the user.

FIG. 6 illustrates a scenario 600 in which images from a user's browsing history 122(4) may be used to generate output data 126. At 602, a user 102 views a first image for a first length of time t=1. For example a user device 118 may be used to view an image corresponding to a first set of image data 108(1). The image data 108(1) may not necessarily be stored in association with the user device 118, but may simply be accessed, generating browsing history 122(4) associated with the user device 118.

At 604, the user 102 views a second image for a second length of time t=2 greater than the first length of time t=1. FIG. 6 depicts the user device 118 viewing a second image corresponding to a second set of image data 108(2). As described previously, the image data 108(2) may not necessarily be stored in association with the user device 118, but may simply be viewed.

At 606, the viewed images and the corresponding viewing times are determined from the user browsing history 122(4). In some implementations, the browsing history 122(4) may be accessed remotely by the server(s) 112. In other implementations, the user device 118 may provide the browsing history 122(4) to the server(s) 112.

At 608, the length of time one or more of the images was viewed is used to generate user preference data 122. In the depicted scenario 600, because the second image was viewed for a greater length of time t=2 than the first image, the user preference data 122 includes data indicative of a preference by the user 102 of the second image. In some implementations, the length of time that an image was viewed may be compared with a threshold time. In other implementations, user preference data 122 may be determined based on the number of times an image was viewed, the number of times an image or a link to the image was provided to other users 102, or the number of times an image was discussed, such as via a SMS or e-mail or via a communication on a social networking platform.

At 610, output data 126 for resources 104 corresponding to the user preference data 122 is provided to the user device 118 for display on an output device associated therewith. In the depicted example, due to the indication of the second image in the user preference data 122, a recommendation for a camera suitable for producing images similar to the second image is shown.

Figure 7:
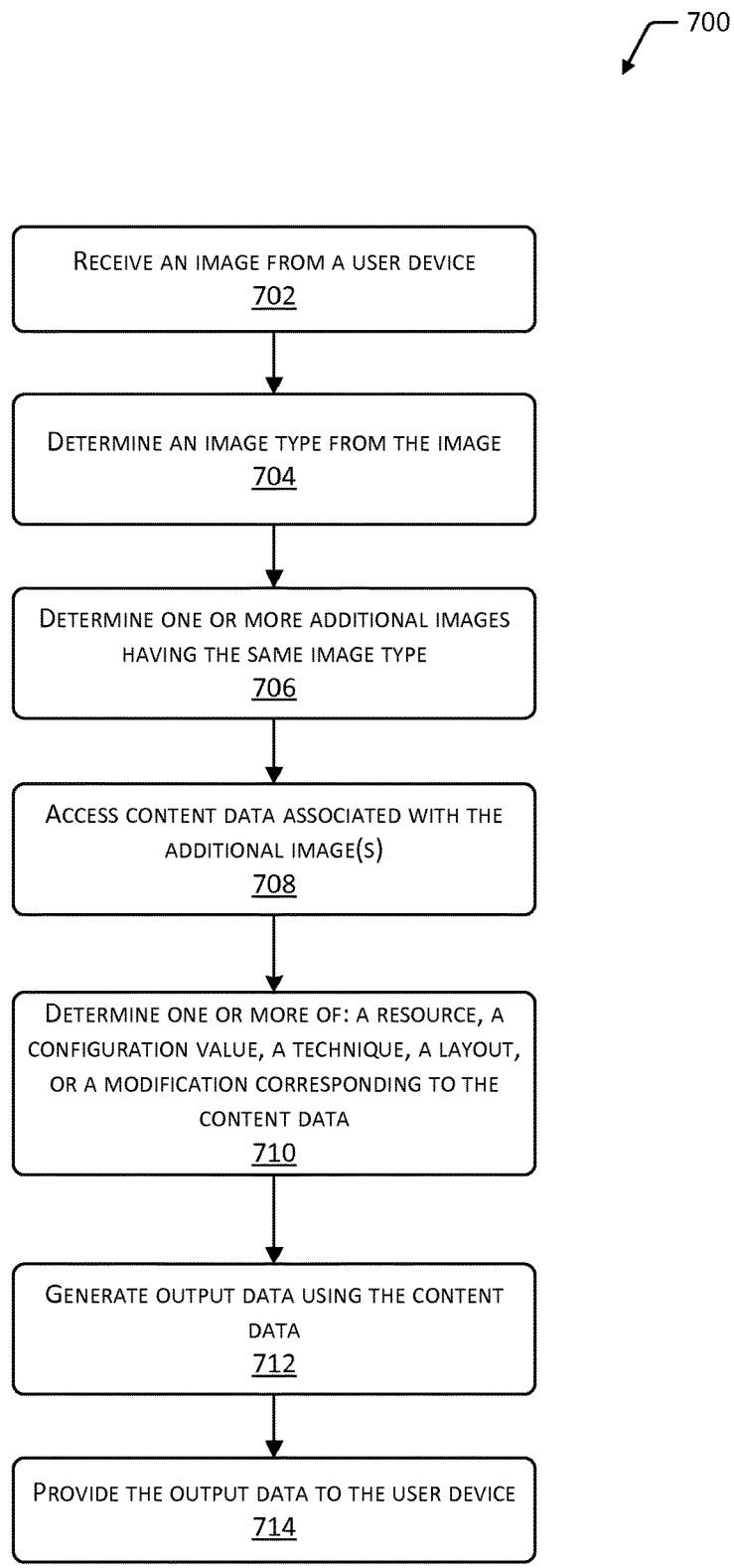
FIG. 7 is a flow diagram illustrating a process usable to determine a resource, configuration value, technique, layout, or modification from content data associated with images similar to an image from a user.

FIG. 7 is a flow diagram 700 illustrating a process for determining one or more of: a resource, configuration value, technique, layout, or modification, from content data associated with images similar to a first image. For example, a user 102 may provide an image having one or more defects, flaws in composition, artifacts, and so forth, to receive recommendations based on content data 106 associated with images of a similar type.

Block 702 receives an image from a user device 118. The received image may have any image type 202(1) or any manner of content data 106 associated therewith. Images may be received directly from a user device 118 or from other computing devices 402 in communication therewith. In some implementations, links or instructions for accessing an image may be received in lieu of the image data 108 itself.

Block 704 determines an image type 202(1) from the image. Specifically, content data 106 associated therewith may be processed to determine an image type 202(1) corresponding to the image, characteristics of resources 104 used to produce the image, and so forth. For example, image processing may be performed on image data 108 to determine one or more visual features of the image. Resource data 110 associated with the image may be processed to determine one or more resources 104, configuration values 110(2), and so forth used to produce the image.

Block 706 determines one or more additional images having the same or a similar image type 202(1). For example, additional images may be stored on one or more severs 112 or on a CRSM in communication with the user device 118 or a server 112. In some implementations, additional images may be located from remote sources, such as through use of the data determination module 444.

Block 708 accesses content data 106 associated with the additional images. Block 710 determines, from the content data 106, one or more of: a resource 104 (e.g., a resource identity 110(1)), a configuration value 110(2), a technique (e.g., technique data 202(3)), a layout (e.g., layout data 202(2)), a modification (e.g., modification data 110(3)), and so forth. Resource information regarding the additional images may be determined from image data 108 associated therewith, such as by use of image processing, or from resource data 110 associated therewith, as described previously.

Block 712 generates output data 126 using the content data 106 associated with the additional images. Block 714 provides the output data 126 to the user device 118. For example, subsequent to receiving an image from a user device 118, the output data 126 may include recommendations for one or more resources 104, configuration values 110(2), techniques, layouts, modifications, and so forth. In some implementations, the output data 126 may include one or more of the additional images. Selection of one or more of the additional images by a user 102 may be used to generate user preference data 122 that may be used to affect the output data 126.

Figure 8:
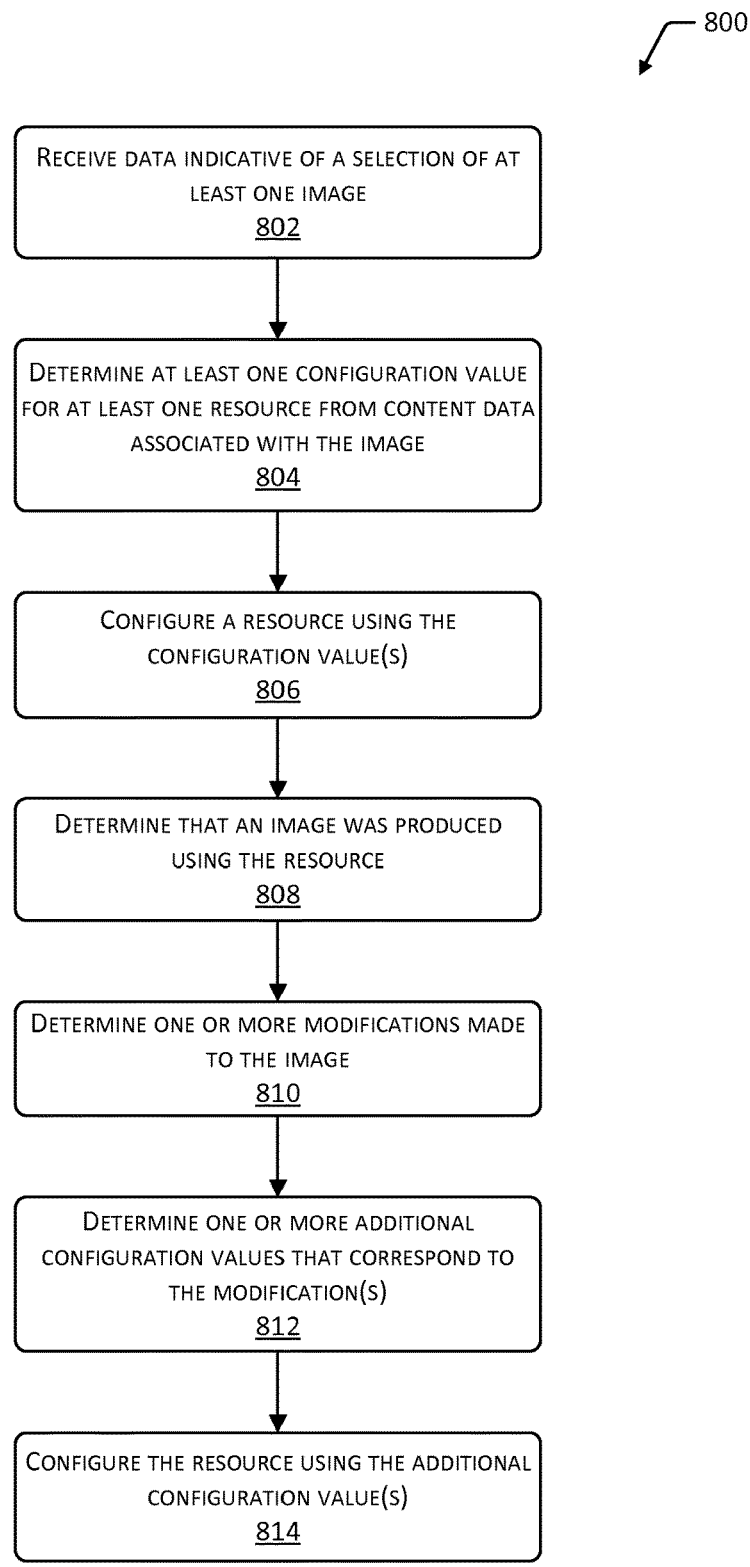
FIG. 8 is a flow diagram illustrating a process usable to configure a resource based on selected images and modifications made to an image produced by a user.

FIG. 8 is a flow diagram 800 illustrating a process for configuring a resource 104 based on the content data 106 associated with selected images, and based on modifications made to an image produced using the resource 104.

Block 802 receives data indicative of a selection of at least one image. For example, a plurality of images may be presented to a user device 118, and a selection of one or more of the images may be received therefrom. In some implementations, images may be received from the user device 118, or determined from the user device 118 (e.g., from a CRSM associated therewith, from networked accounts associated therewith, and so forth).

Block 804 determines at least one configuration value 110(2) for at least one resource 104 from the content data 106 associated with the selected image(s). The configuration value(s) 110(2) may be present in the resource data 110 associated with the image. In some implementations, the configuration value(s) 110(2) may be determined from the image data 108, or using one or more sources of supplemental data 202. For example, image processing may be performed to identify features of the image data 108 that correspond to one or more configuration values 110(2). Alternatively, review data 202(5), a user purchase history 202(4), or similar sources of supplemental data 202 may be usable to determine one or more configuration values 110(2).

Block 806 configures a resource 104 using the configuration value(s) 110(2). The configuration value(s) 110(2) may be pushed to the resource 104 automatically, or in some implementations, a user 102 may be prompted to accept configuration of the resource 104. In other implementations, a user 102 may be provided with instructions regarding manual configuration of the resource 104 using the configuration value(s) 110(2).

Block 808 determines that an image was produced using the resource 104. For example, upon actuation of a camera to photograph an object, the production of an image may take place.

Block 810 determines one or more modifications made to the image. For example, a produced image may be edited to enhance one or more features, to remove undesired artifacts, and so forth. Modification data 110(3) corresponding to the modifications made may be determined from the content data 106 of the produced image. For example, modifications may be determined from the resource data 110 or through processing of the image data 106.

Block 812 determines one or more additional configuration values 110(2) that correspond to the modification(s). For example, using the modification data 110(3), it may be determined that modifying a configuration value 110(2) may reduce or eliminate the need to modify subsequent images produced using the resource 104.

Block 814 configures the resource 104 using the additional configuration value 110(2). For example, the additional configuration value 110(2) may be provided from one or more servers 112 to a resource 104 for automatic configuration thereof. In some implementations, a user 102 of the resource 104 may be prompted regarding whether to accept or decline configuration of the resource 104 using the additional configuration value 110(2). In other implementations, the configuration value 110(2) may be provided in the form of instructions for manual configuration of the resource 104.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   accessing image data associated with a plurality of images;
   receiving first user input that interacts with a subset of the plurality of images;
   determining user preference data associated with the subset of the plurality of images based at least in part on the first user input;
   in response to the user preference data, performing image analysis on the subset of the plurality of images to determine one or more characteristics associated with the subset of the plurality of images;
   determining, based on analysis of the image data associated with the subset of the plurality of images and the one or more characteristics, one or more resources associated with the one or more characteristics of the subset of the plurality of images;
   generating first output data indicative of the one or more resources associated with the subset of the plurality of images;
   receiving second user input indicative of a particular resource of the one or more resources;
   determining, based on the analysis of the image data, a configuration value for the particular resource; and
   configuring the particular resource using the configuration value.

2. The method of claim 1, wherein the one or more resources comprise one or more of the following:
   a camera;
   a lens;
   a flash;
   a strobe light;
   a reflector;
   a filter;
   computer-executable instructions adapted to instruct a hardware processor to modify content data associated with one or more images of the plurality of images;
   a display device;
   a printer; or
   a material adapted for application of the one or more images thereto.

3. The method of claim 1, further comprising:
   determining, based at least in part on the image data, resource data associated with the one or more resources, wherein the resource data comprises one or more of:
   an identity of at least a portion of the one or more resources;
   a characteristic of the at least a portion of the one or more resources;
   an indication of a time one or more of the plurality of images was generated;
   an indication of a location at which the one or more of the plurality of images was generated; or
   a characteristic of the one or more of the plurality of images.

4. The method of claim 1, wherein the one or more characteristics include one or more of a type associated with an image, a size associated with the image, a resolution associated with the image, or a characteristic of one or more pixels of the image.

5. The method of claim 1, wherein determining the user preference data further comprises one or more of:
   determining that one or more images of the subset of the plurality of images is stored in a computer-readable storage medium associated with the first user input;
   receiving one or more images of the subset of the plurality of images from one or more of the first user input or the computer-readable storage medium;
   receiving a selection of one or more images of the subset of the plurality of images from the first user input;
   determining that one or more images of the subset of the plurality of images is included in a browsing history associated with a device associated with the first user input; or
   determining one or more images of the subset of the plurality of images from a social networking platform associated with the first user input.

6. The method of claim 1, wherein determining the user preference data further comprises:
   accessing one or more of a browsing history or a computer-readable medium associated with a device associated with the first user input, wherein the one or more of the browsing history or the computer-readable medium comprises one or more images of the subset of the plurality of images;
   determining a length of time associated with viewing of the one or more images of the subset of the plurality of images; and
   determining that the length of time associated with the viewing of the one or more images of the subset of the plurality of images exceeds a length of time associated with viewing at least one additional image in the one or more of the browsing history or the computer-readable storage medium.

7. The method of claim 1, further comprising:
   determining, based on analysis of the image data, one or more of layout data indicative of placement of the at least one resource within an environment associated with an image or a technique for use of the at least one resource; and
   generating second output data indicative of the one or more of the layout data or the technique.

8. The method of claim 1, further comprising determining, based on analysis of the image data, at least one modification applied to one or more images of the subset of the plurality of images.

9. The method of claim 1, further comprising:
   determining a user associated with one or more images of the subset of the plurality of images;
   determining a purchase history of the user; and
   determining the one or more resources associated with the subset of the plurality of images using the purchase history.

10. The method of claim 1, further comprising:
    receiving a cost constraint;
    determining a value associated with the one or more resources associated with the subset of the plurality of images exceeds the cost constraint;
    determining additional user preference data;
    determining at least one resource associated with the additional user preference data and having a cost less than or equal to the cost constraint; and generating output data indicative of the at least one resource associated with the additional user preference data.

11. A non-transitory computer-readable medium comprising computer-executable instructions for causing a hardware processor to perform the method of:
receiving first user input indicative of a selection of at least one image, wherein production of the at least one image uses at least one resource;
determining user preference data associated with the at least one image based at least in part on the first user input;
in response to the user preference data, determining the at least one resource associated with the at least one image;
generating first output data indicative of the at least one resource;
receiving second user input indicative of a selection of a particular resource;
performing image analysis on the at least one image to determine one or more characteristics associated with the at least one image;
determining, based on the one or more characteristics and analysis of the at least one image, content data that is associated with the one or more characteristics, wherein the content data comprises an indication of at least one configuration value for the particular resource; and
configuring the particular resource using the at least one configuration value.

12. The non-transitory computer-readable medium of claim 11, wherein the computer-executable instructions further cause the hardware processor to determine, based on image analysis of the at least one image, layout data corresponding to placement of the particular resource relative to at least one other resource within an environment associated with the at least one image, and wherein the layout data comprises a diagram stored in association with the content data.

13. The non-transitory computer-readable medium of claim 11, wherein the computer-executable instructions further cause the hardware processor to:
access review data from a data source associated with sale of the particular resource;
determine, based on the review data, a technique for use of the particular resource; and
generate second output data indicative of the technique associated with the particular resource.

14. The non-transitory computer-readable medium of claim 11, wherein the computer-executable instructions further cause the hardware processor to:
access resource data corresponding to the particular resource, wherein the resource data comprises at least one constraint;
determine that the at least one constraint limits configuration of the particular resource using the at least one configuration value;
access one or more of: additional content data, review data, or user preference data, wherein the one or more of the additional content data, the review data, or the user preference data comprises an indication of at least one additional configuration value; and
configure the particular resource using the at least one additional configuration value.

15. The non-transitory computer-readable medium of claim 11, wherein the computer-executable instructions further cause the hardware processor to:
determine output of the at least one image;
determine at least one modification made to the at least one image prior to output of the at least one image;
determine at least one additional configuration value corresponding to the at least one modification; and
configure the at least one resource using the at least one additional configuration value.

16. The non-transitory computer-readable medium of claim 11, wherein the computer-executable instructions further cause the hardware processor to:
determine an image type from the at least one image;
determine at least one additional image having the image type;
determine additional content data from the at least one additional image, wherein the additional content data comprises an indication of one or more of:
a resource corresponding to the additional content data;
a configuration value corresponding to the additional content data;
a technique corresponding to the additional content data;
a layout corresponding to the additional content data; or
at least one modification corresponding to the additional content data; and
generate output data comprising the indication.

17. A system comprising:
one or more memories storing computer-executable instructions; and
one or more hardware processors to execute the computer-executable instructions to:
receive first user input indicative of a selection of at least one image;
determine user preference data associated with the at least one image based at least in part on the first user input;
in response to the user preference data, perform image analysis on the at least one image to determine one or more characteristics associated with the at least one image;
determine, based at least in part on the one or more characteristics and analysis of the at least one image, an indication of one or more resources associated with the one or more characteristics of the at least one image;
determine, based at least in part on the at least one image, one or more characteristics of the one or more resources;
generate first output data indicative of the one or more resources and the one or more characteristics;
receive second user input indicative of a selection of a particular resource;
determine, based at least in part on the analysis of the at least one image, a configuration value for the particular resource; and
configure the particular resource based on the configuration value.

18. The system of claim 17, wherein the one or more characteristics include a cost of the particular resource, the system further comprising computer-executable instructions to:
determine a cost constraint;
determine that a first value associated with a first resource of the one or more resources exceeds the cost constraint;
access user preference data associated with the at least one image;

determine, based at least in part on the user preference data, at least a second resource having a second value less than the cost constraint; and include an indication of the at least the second resource in second output data.

19. The system of claim 17, further comprising computer-executable instructions to:

determine, based at least in part on the analysis of the at least one image, one or more of layout data indicative of placement of the particular resource within an environment associated with an image or a technique for use of the particular resource; and generate second output data indicative of the one or more of the layout data or the technique.

20. The system of claim 17, further comprising computer-executable instructions to:

access review data from a data source associated with sale of the particular resource;

determine, based on the review data, one or more of: a technique, layout data indicative of placement of the particular resource within an environment, or a modification associated with one or more of the at least one image or the particular resource; and include the one or more of the technique, the layout data, or the modification in second output data.

* * * * *